(12) United States Patent
Pempsell et al.

(10) Patent No.: US 7,774,806 B2
(45) Date of Patent: Aug. 10, 2010

(54) THIN OPTICAL DISC HAVING REMOTE READING CAPABILITY

(75) Inventors: Mark Pempsell, Bedford, TX (US); Ryan Corley, Austin, TX (US); Linda Gale Howard, Tulsa, OK (US)

(73) Assignee: EnXnet, Inc., Tulsa, OK (US)

( * ) Notice: Subject to any disclaimer, the term of this patent is extended or adjusted under 35 U.S.C. 154(b) by 245 days.

(21) Appl. No.: 11/539,555

(22) Filed: Oct. 6, 2006

(65) Prior Publication Data

US 2007/0086317 A1    Apr. 19, 2007

Related U.S. Application Data

(60) Provisional application No. 60/724,450, filed on Oct. 7, 2005, provisional application No. 60/748,485, filed on Dec. 7, 2005.

(51) Int. Cl.
G11B 23/03    (2006.01)

(52) U.S. Cl. ..................................... 720/721

(58) Field of Classification Search ............... None
See application file for complete search history.

(56) References Cited

U.S. PATENT DOCUMENTS

| | | | |
|---|---|---|---|
| 4,634,617 A | 1/1987 | Ohta et al. | 428/65 |
| 5,347,508 A | 9/1994 | Montbriand et al. | 369/273 |
| 5,489,768 A | 2/1996 | Brownstein et al. | 235/414 |
| 5,597,068 A | 1/1997 | Weisburn et al. | 206/308.1 |
| 5,706,266 A | 1/1998 | Brownstein et al. | 369/58 |
| 5,892,748 A | 4/1999 | Kikuchi | 369/112 |
| 5,932,866 A | 8/1999 | Terada et al. | 235/487 |
| 5,939,985 A | 8/1999 | Tsai et al. | 340/572.1 |
| 5,982,736 A | 11/1999 | Pierson | 369/273 |
| 5,999,513 A | 12/1999 | Arakawa et al. | 369/282 |
| D419,152 S | 1/2000 | Lowenstein | D14/121 |
| 6,016,298 A | 1/2000 | Fischer | 369/75.1 |
| 6,044,046 A | 3/2000 | Diezmann et al. | 369/14 |
| 6,078,557 A | 6/2000 | Pierson | 369/273 |
| 6,198,875 B1 | 3/2001 | Edenson et al. | |
| 6,201,777 B1 | 3/2001 | Tsuchiya et al. | 369/53.23 |
| 6,292,461 B1 | 9/2001 | Kikuchi et al. | 369/290 |

(Continued)

FOREIGN PATENT DOCUMENTS

EP    0 996 124 A1    4/2000

(Continued)

OTHER PUBLICATIONS

Notification of Transmittal of the International Search Report or the Declaration related to PCT/US06/39231 filed Oct. 6, 2006, and mailed May 23, 2007 (9 pages).

(Continued)

*Primary Examiner*—Mark Blouin

(57) ABSTRACT

In accordance with the teachings of the present invention, a thin optical disc having remote reading capability is provided. In accordance with a particular embodiment of the present invention, the optical disc includes a central clamping area that defines a central aperture operable to be engaged by a spindle mechanism of an optical disc drive, an optically-readable data storage area substantially surrounding the central clamping area, the optically-readable data storage area having a planar thickness of less than 1.20 mm, and an electronic tag coupled to or embedded within the optical disc, the electronic tag comprising a radio frequency tag or radio frequency identification tag.

61 Claims, 5 Drawing Sheets

U.S. PATENT DOCUMENTS

| | | | |
|---|---|---|---|
| 6,304,544 | B1 | 10/2001 | Pierson et al. .............. 369/273 |
| 6,484,940 | B1 | 11/2002 | Dilday et al. |
| 6,510,124 | B1 | 1/2003 | Wood ........................ 369/273 |
| 6,597,653 | B1 | 7/2003 | Burnett |
| 6,747,930 | B1 | 6/2004 | Weldon et al. ........... 369/53.21 |
| 6,762,988 | B2 | 7/2004 | Wood ........................ 369/273 |
| 6,775,839 | B1 | 8/2004 | O'Brien |
| 6,814,286 | B2* | 11/2004 | Cheung ..................... 235/440 |
| D502,469 | S | 3/2005 | Pierson ..................... D14/478 |
| D503,404 | S | 3/2005 | Wood ........................ D14/478 |
| 6,902,111 | B2 | 6/2005 | Han et al. |
| 6,947,371 | B2 | 9/2005 | Bigley |
| 6,986,151 | B2 | 1/2006 | Lenssen et al. ............. 720/718 |
| 7,070,112 | B2 | 7/2006 | Beenau et al. |
| 7,117,512 | B1* | 10/2006 | Cahill ........................ 720/745 |
| 7,197,756 | B2 | 3/2007 | Lee et al. ................... 720/721 |
| 7,258,273 | B2 | 8/2007 | Griffin ....................... 235/380 |
| 7,290,709 | B2* | 11/2007 | Tsai et al. ................... 235/449 |
| 2001/0009542 | A1* | 7/2001 | Benedetti ................... 369/280 |
| 2001/0038033 | A1 | 11/2001 | Habib ........................ 235/375 |
| 2002/0167890 | A2* | 11/2002 | Duroj ........................ 369/273 |
| 2003/0034400 | A1 | 2/2003 | Han et al. ................... 235/487 |
| 2003/0090380 | A1 | 5/2003 | Hasegawa ................ 340/572.6 |
| 2003/0155425 | A1 | 8/2003 | Lynch ........................ 235/492 |
| 2004/0041711 | A1 | 3/2004 | Loewidt ..................... 340/825 |
| 2004/0047280 | A1 | 3/2004 | Lee et al. ................... 369/282 |
| 2004/0054594 | A1 | 3/2004 | Forster et al. ................ 705/18 |
| 2004/0056102 | A1* | 3/2004 | Cheung ...................... 235/486 |
| 2004/0133905 | A1 | 7/2004 | Aramaki et al. ............ 720/718 |
| 2004/0218518 | A1* | 11/2004 | Liu et al. ................... 369/292 |
| 2005/0012618 | A1 | 1/2005 | Pempsell et al. ......... 340/572.8 |
| 2005/0238149 | A1 | 10/2005 | De Leon ................... 379/93.12 |
| 2005/0270964 | A1 | 12/2005 | Ujino ........................ 369/274 |
| 2006/0028344 | A1 | 2/2006 | Forster .................... 340/572.7 |
| 2006/0065742 | A1 | 3/2006 | Centofante et al. .......... 235/492 |
| 2006/0071795 | A1 | 4/2006 | Benedikt .................... 340/572 |
| 2006/0072445 | A1 | 4/2006 | Hegel ..................... 369/275.1 |
| 2006/0077062 | A1 | 4/2006 | Andrechak et al. ....... 340/572.8 |
| 2006/0150209 | A1 | 7/2006 | Hayashi et al. ............. 720/718 |
| 2006/0154719 | A1 | 7/2006 | Okuniewicz ................. 463/25 |
| 2006/0198281 | A1 | 9/2006 | Corley et al. ................ 369/273 |
| 2006/0206910 | A1 | 9/2006 | Kozenitzky et al. ......... 720/718 |
| 2007/0136738 | A1 | 6/2007 | Lee et al. ................... 720/721 |

FOREIGN PATENT DOCUMENTS

| | | |
|---|---|---|
| EP | 1 030 303 A2 | 8/2000 |
| EP | 1 291 874 A | 3/2003 |
| EP | 1 396 855 A | 3/2004 |
| FR | 2 794 276 | 12/2000 |
| JP | 64-033744 | 2/1989 |
| JP | 01 064163 A | 3/1989 |
| JP | 10269621 | 10/1998 |
| JP | 11053764 | 2/1999 |
| JP | 2000132945 | 5/2000 |
| JP | 2001331977 | 11/2001 |
| JP | 2005100477 A | 4/2005 |
| KR | 20-0225836 | 3/2001 |
| KR | 2001-0035181 | 5/2001 |
| KR | 10-0315905 | 11/2001 |
| KR | 10-0334199 | 4/2002 |
| WO | WO 02/25582 A2 | 3/2002 |
| WO | WO 00/23994 | 4/2000 |
| WO | WO 00/42605 | 7/2000 |
| WO | WO 2004/025645 A2 | 3/2004 |
| WO | WO 2005/017881 | 2/2005 |

OTHER PUBLICATIONS

Pempsell, et al., *Thin Optical Disk Having Remote Reading Capability*, U.S. Appl. No. 11/961,812, filed Dec. 20, 2007.
Search results from PlusPat for FAM KR 2001035181 (2 pages) dated Jan. 14, 2005.
Notification of Transmittal of International Search Report and the Written Opinion of International Searching Authority,or the Declaration related to PCT/US06/06874 filed Feb. 27, 2006, mailed Jul. 8, 2008 (11 pages).
Supplementary European search report under Article 153(7) EPC re Appln. 04752981.3-1232/1627383 (PCT/US2004/016081, mailed Aug. 21, 2008 (4 pages).
Notification of Transmittal of The International Search Report or the Declaration related to PCT/US04/16081 filed May 21, 2004, and mailed Jan. 21, 2005 (10 pages).
"How do the shoplifting prevention systems in stores work?" from howstuffworks website, printed Feb. 28, 2004, http://electronics.howstuffworks.com/questions601.htm/printable (4 pages).
"How Anti-shoplifting Devices Work" from howstuffworks website, printed Feb. 28, 2004, http://electronics.howstuffworks.com/anti-shoplifting-device.htm/printable (11 pages).
LeMaster, "Compact Disc Manufacturing, Procedures and Processes" (10 pages), Mar. 5, 1994 http//www.ee.washington.edu/conselec/W94/edward/edward.htm.
Pempsell, et al., U.S. Appl. No. 11/364,696, filed Feb. 27, 2006, Communication from the U.S. Patent Office mailed Mar. 24, 2009.
Pempsell, et al., U.S. Appl. No. 11/961,812, filed Dec. 20, 2007, Communication from the U.S. Patent Office mailed May 27, 2009.
Extended European Search Report dated Jul. 16, 2009 with reference to PCT/US2006/006874.
"Standard ECMA-279: '80 mm (1,23 Gbytes per side) and 120 mm (3,95 Gbytes per side) DVD-Recordable Disk (DVD-R)" Dec. 1, 1998, XP002183289, retrieved from Internet: URL:ftp://ftp.ecma.ch/Ecma-279.pdf.
Communication from Japanese Patent Office dated Sep. 29, 2009 and mailed Oct. 6, 2009 regarding Japanese Patent Application No. 2007-558100.
Pempsell et al., U.S. Appl. No. 10/850,990, filed May 20, 2004, Office communication from U.S. Patent and Trademark Office, dated Jun. 29, 2005 (9 pgs).
Pempsell et al., U.S. Appl. No. 10/850,990, filed May 20, 2004, Office communication from U.S. Patent and Trademark Office, dated Feb. 7, 2006 (8 pgs).
Pempsell et al., U.S. Appl. No. 10/850,990, filed May 20, 2004, Office communication from U.S. Patent and Trademark Office, dated Apr. 27, 2006 (8 pgs).
Pempsell et al., U.S. Appl. No. 10/850,990, filed May 20, 2004, Office communication from U.S. Patent and Trademark Office, dated Jun. 14, 2007 (8 pgs).
Pampsell et al., U.S. Appl. No. 10/850,990, filed May 20, 2004, Office communication from U.S. Patent and Trademark Office, dated Mar. 24, 2008 (9 pgs).
Communication from European Patent Office, Netherlands, dated Dec. 19, 2008 re Patent Appln. EP 06 81 6452 (PCT/US06/039231.
"Data interchange on read-only 120 mm optical data disks (CD-ROM)," *Standard ECMA-130*, 2nd Edition, Jun. 1996, ECMA Standardizing Information and Communication Systems.
PCT Notification of Transmittal of The International Search Report and the Written Opinion of the International Searching Authority, or the Declaration mailed Jan. 9, 2009, re PCT/US 08/83300 filed Nov. 13, 2008.
Office Action dated Mar. 23, 2010 in connection with Japanese Patent Application No. 2008-534734.
Office Action dated Apr. 29, 2010 in connection with Chinese Patent Application No. 200680037208.4.

\* cited by examiner

THIN OPTICAL DISC HAVING REMOTE READING CAPABILITY

RELATED APPLICATIONS

This application claims priority to U.S. Provisional Application Ser. No. 60/724,450 filed Oct. 7, 2005, and U.S. Provisional Application Ser. No. 60/748,485 filed Dec. 7, 2005.

TECHNICAL FIELD OF THE INVENTION

The present invention relates generally to optically readable media and, more particularly, to a thin optical disc having remote reading capability.

BACKGROUND OF THE INVENTION

Optical discs, such as compact discs ("CDs") and digital video discs ("DVDs"), are often used to store computer-readable information. Typically, this information is stored on optical discs in the form of a single track of "lands" and "pits" that spirals outward from the center of the disc. Using a tightly focused laser beam, these lands and pits may be read by an optical disc drive. By reading the lands and pits, the optical disc drive can generate electrical voltages which are matched against a timing circuit to generate a binary stream that is readable by a computer.

Magnetic stripe cards, such as credit and debit cards, are also used to store computer-readable information. Typically, such magnetic stripe cards comprise a plastic card having a magnetic stripe comprising a magnetically sensitive material. Conventional magnetic technology is then used to store information, such as a credit account number, on the magnetic stripe. The card can then be read by "swiping" the card through a reader having a magnetic head that senses the magnetic polarities encoded on the magnetic stripe to thereby derive the information encoded on the magnetic stripe.

Recently, some magnetic stripe cards, credit cards, and/or debit cards have also begun including contactless payment features, including RFID tags, that allow the cards to function in contactless payment systems. This allows cardholders to make financial transaction without having to "swipe" the magnetic stripe. Instead, the RFID tag communicates with a RFID tag reader at a point-of-sale to complete the financial transaction.

Previous attempts have been made at combining optical discs and magnetic stripe cards into a single data storage device. For example, U.S. Pat. No. 6,597,653 issued to Burnett discloses an interactive transaction card that combines magnetically and optically readable storage. However, combining optically readable storage and magnetically readable storage into a commercially-viable transaction card requires that the resulting transaction card be thin enough to be read by traditional magnetic stripe readers, which can only swipe cards less than about 0.96 mm thick. Because of this, traditional magnetic stripe cards typically have a planar thickness from about 0.80 mm to about 0.86 mm. Unfortunately, traditional optical discs have planar thickness of 1.20 mm. When the planar thicknesses of these optical discs are reduced below 1.20 mm, some optical disc drives may have problems reading the data stored on the optical disc due to problems with clamping/engaging the optical disc and/or focusing their lasers at the proper depth within the optical disc.

SUMMARY OF THE INVENTION

In accordance with the teachings of the present invention, an thin optical disc having remote reading capability is provided. In accordance with a particular embodiment of the present invention, a thin optical disc having remote reading capability comprises a central clamping area that defines a central aperture operable to be engaged by a spindle mechanism of an optical disc drive, an optically-readable data storage area substantially surrounding the central clamping area, the optically-readable data storage area having a planar thickness of less than 1.20 mm, and an electronic tag coupled to or embedded within the optical disc, the electronic tag comprising a radio frequency tag or radio frequency identification tag.

A technical advantage of particular embodiments of the present invention includes an optical disc including a radio frequency ("RF") or radio frequency identification ("RFID") tag. In particular embodiments of the present invention, these tags may be configured to operate as part of a contactless payment system, allowing a user to complete financial transactions using the optical disc without having to optically or magnetically read the disc.

Another technical advantage of particular embodiments of the present invention includes an optical disc having a reduced planar thickness with little or no reduction in the readability of the data stored on the disc. For example, optical discs in accordance with the teachings of the present invention typically have planar thicknesses less than 1.20 mm, in some cases less than or equal to about 0.58 mm. To prevent the reduced planar thickness from adversely affecting the readability of the disc, particular embodiments of the present invention include one or more stacker elements coupled to, or integral with, the central clamping area. These stacker elements may help positioning the optical disc relative to the reading laser of an optical drive.

Yet another technical advantage of particular embodiments of the present invention includes an optical disc comprising a magnetic stripe, allowing the disc to store both optically-readable and magnetically-readable information. Due to the reduced thickness of the optical disc, particular embodiments of the present invention may be "swiped" through traditional "swipe"-type magnetic card readers with little or no ill effects on the optical disc or magnetic card reader.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which.

DETAILED DESCRIPTION OF THE INVENTION

In accordance with the teachings of the present invention, a thin optical disc having remote reading capability is provided. In accordance with a particular embodiment of the present invention, the thin optical disc comprises a central clamping area that defines a central aperture operable to be engaged by a spindle mechanism of an optical disc drive, an optically-readable data storage area substantially surrounding the central clamping area, the optically-readable data storage area having a planar thickness of less than 1.20 mm, and an electronic tag coupled to or embedded within the optical disc, the electronic tag comprising a radio frequency tag or radio frequency identification tag. By incorporating an electronic tag into the optical disc, particular embodiments of the present invention may be used as part of a contactless payment system, where the optical disc may be used to conduct financial transactions without optically or magnetically reading the disc.

Figure 1A:
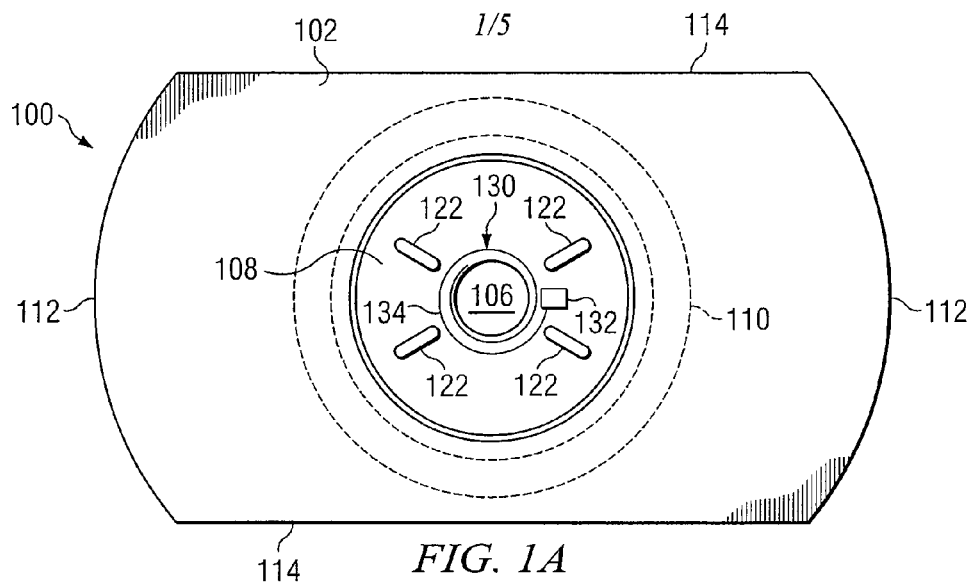
FIG. 1A illustrates a surface view of the optically-readable side of an optical disc having reduced planar thickness in accordance with a particular embodiment of the present invention.
Figure 1B:
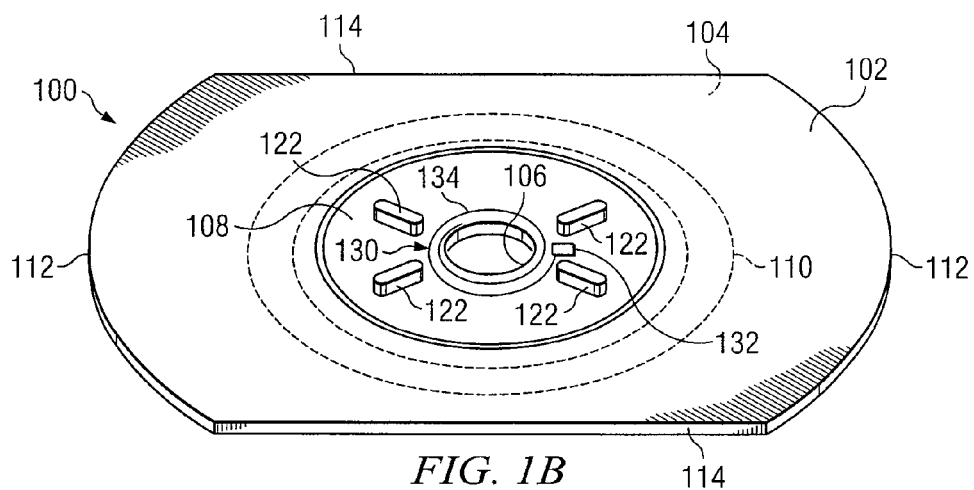
FIG. 1B illustrates a perspective view of the optically readable side of the optical disc shown in FIG. 1A.
Figure 1C:
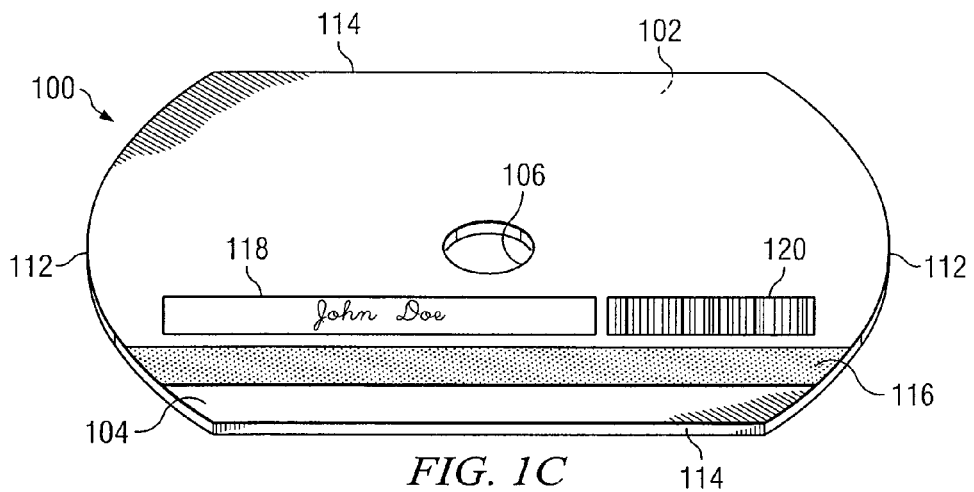
FIG. 1C illustrates a perspective view of the non-optically readable side of the optical disc shown in FIGS. 1A and 1B.
Figure 1D:
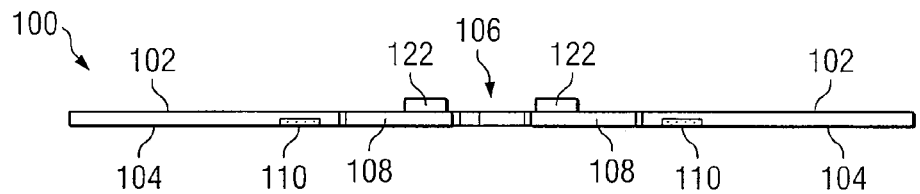
FIG. 1D illustrates a cutaway side view of the optical disc shown in FIGS. 1A-C.

FIGS. 1A-D illustrate an optical disc 100 in accordance with a particular embodiment of the present invention. In particular, FIGS. 1A and 1B illustrate a surface view and perspective view, respectively, of an optically readable side 102 of optical disc 100, FIG. 1C illustrates a perspective view of a non-optically readable side 104 of optical disc 100, and FIG. 1D illustrates a cutaway side view of optical disc 100.

As shown in FIGS. 1A-D, optical disc 100 generally comprises a central clamping area 108 that defines a central aperture 106 that is operable to be engaged by the spindle mechanism of an optical disc drive. This central clamping area 108 is radially surrounded by an optically-readable data storage area 110, which comprises information encoded in the form of pits and lands on the optical disc that are readable by an optical disc drive. In particular embodiments, data storage area 110 may include embedded data that may be used to optimize, or at least affect, the reading speeding of an optical disc drive attempting to read optical disc 100.

Generally, optical disc 100 has a planar thickness less than 1.20 mm. In particular embodiments of the present invention, optical disc 100 has a planar thickness of less than or equal to about 0.95 mm. In particular embodiments of the present invention, optical disc 100 has a planar thickness of less than or equal to about 0.85 mm. In particular embodiments, optical disc 100 may have a planar thickness less than or equal to about 0.58 mm. In particular embodiments, optical disc 100 may have a planar thickness from about 0.80 mm to about 0.86 mm.

As discussed above, some optical disc readers may have difficulty reading data stored on optical discs having planar thicknesses less than 1.20 mm, due to problems clamping/engaging the optical discs and/or focusing their reading laser at the correct depth in the optical disc. To alleviate and/or overcome this problem, optical disc 100 also includes a plurality of stacker elements 122 coupled to, or formed integrally with, central clamping area 108. In particular embodiments of the present invention, stacker elements 122 are formed as part of the injection molding process by which optical disc 100 is formed. In other embodiments, stacker elements 122 may be coupled to optical disc 100 after injection molding. Regardless of the method by which stacker elements 122 are formed, stacker elements 122 increase the thickness of clamping area 108 above that of optical data storage area 110. In particular embodiments, these stacker elements 122 may increase the thickness of central clamping area 108 such that the total planar thickness of central clamping 108 and stacker elements 122 approaches 1.20 mm (i.e., the thickness of traditional optical discs) or more. In particular embodiments of the present invention, this increased thickness helps facilitate the clamping/engaging of optical disc 100 by an optical disc drive. In particular embodiments, the increased thickness may also help position optical data storage area 110 relative to the reading laser of the optical disc drive, helping to ensure that the reader laser is focused at the appropriate depth to read the data stored on the optical disc.

As shown in FIGS. 1A-B, optical disc 100 includes four stacker elements 122 that radiate outwardly from central aperture 108 towards optical data storage area 110. However, it should be understood that any suitable number, shape, and/or configuration of stacker elements 122 may be used in accordance with the teachings of the present invention. Therefore, as used herein "stacker element" refers to any suitable stacker element including, without limitation, stacker plates, stacker rings, stacker bars and/or stacker beams. FIGS. 3A-5B further illustrate examples of some of these stacker elements that may be used in accordance with the teachings of the present invention.

Figure 3A:
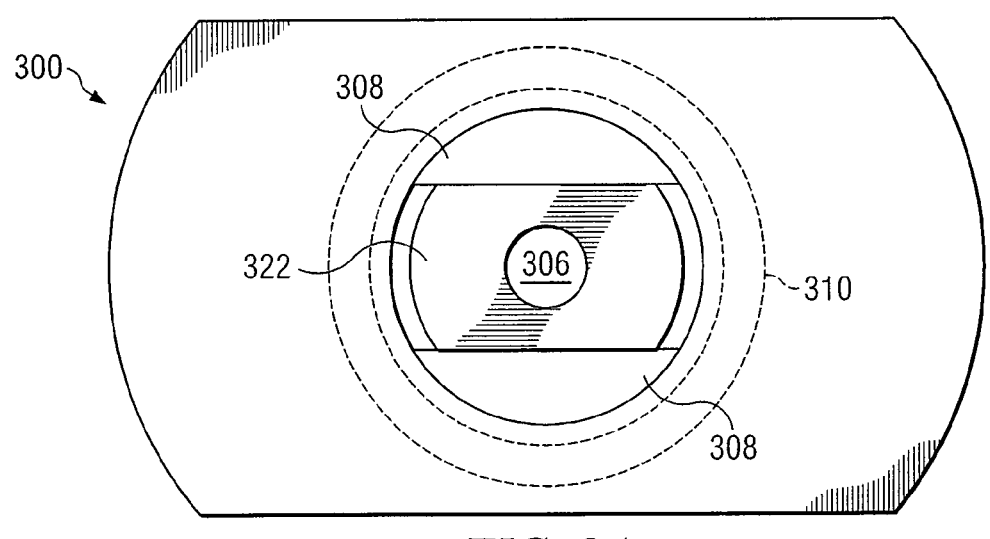
FIG. 3 illustrates an optical disc comprising a stacker plate in accordance with a particular embodiment of the present invention.
Figure 3B:
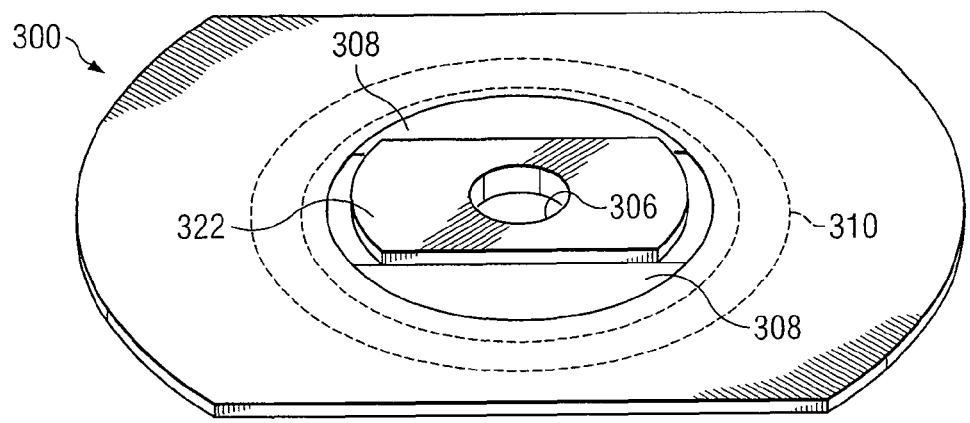

FIGS. 3A and 3B illustrate the optically readable side of an optical disc 300 featuring a stacker plate 322 in accordance with a particular embodiment of the present invention. Similar to optical disc 100 (FIGS. 1A-D), optical disc 300 comprises a central clamping area 308 that defines a central aperture 306, which is configured to be engaged by the spindle mechanism of an optical disc drive. Radially surrounding central clamping area 308 is an optical data storage area 310, which stores data in the form of pits and lands that may be read by the reading laser of an optical disc drive. Stacker plate 322 is coupled to, or formed integrally with, central clamping area 308 and is configured to increased the planar thickness of central clamping area 308 above the planar thickness of optical data storage area 310. Stacker plate 322 is referred to as a "plate" because its width is far greater than its height, and because it covers a substantial portion of central clamping area 308. In particular embodiments of the present invention, stacker plate 322 may cover substantially all of central clamping area 322. In other embodiments, stacker plate 322 need only cover a substantial portion of central clamping area 308.

Figure 4A:
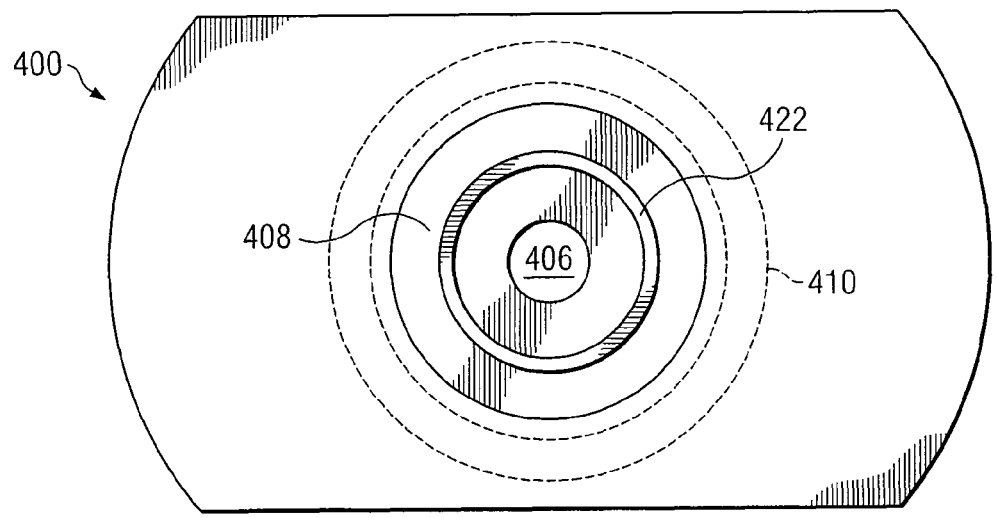
FIG. 4 illustrates an optical disc comprising a stacker ring in accordance with a particular embodiment of the present invention.
Figure 4B:
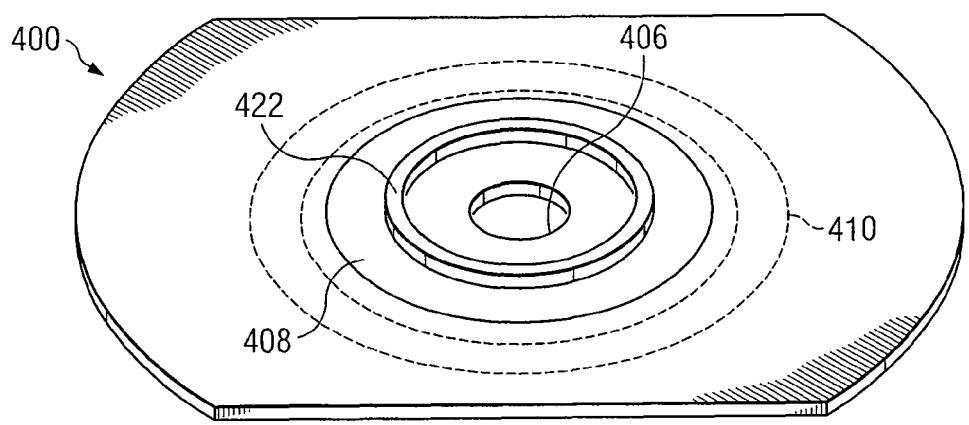

FIGS. 4A-B illustrate the optically readable side of an optical disc 400 featuring a stacker ring 422 in accordance with the teachings of the present invention. Similar to optical disc 300 (FIGS. 3A-B), optical disc 400 comprises a central clamping area 408 that defines a central aperture 406, which is configured to be engaged by the spindle mechanism of an optical disc drive. Radially surrounding central clamping area 408 is an optical data storage area 410, which stores data in the form of pits and lands that may be read by the reading laser of an optical disc drive. Stacker ring 422 is coupled to, or formed integrally with, central clamping area 408 and is configured to increased the planar thickness of central clamping area 408 above the planar thickness of optical data storage area 410. Unlike stacker plate 322 (FIGS. 3A-B), stacker ring 422 has a substantially ring-like structure. In particular embodiments, stacker ring 422 may be concentric with central aperture 406. Although only one stacker ring 422 is illustrated in FIGS. 4A-B, it should be understood by one of ordinary skill in the art that multiple stacker rings 422, as well as stacker rings of different radial thicknesses may be used without deviating from the teachings of the present invention.

Figure 5A:
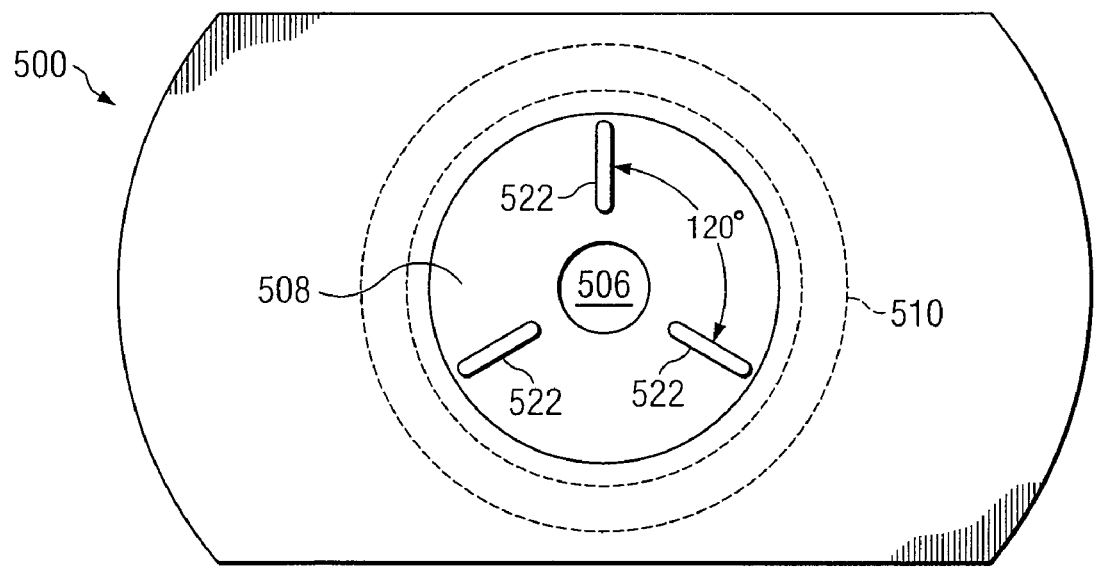
FIG. 5 illustrates an optical disc comprising a plurality of stacker bars in accordance with a particular embodiment of the present invention.
Figure 5B:
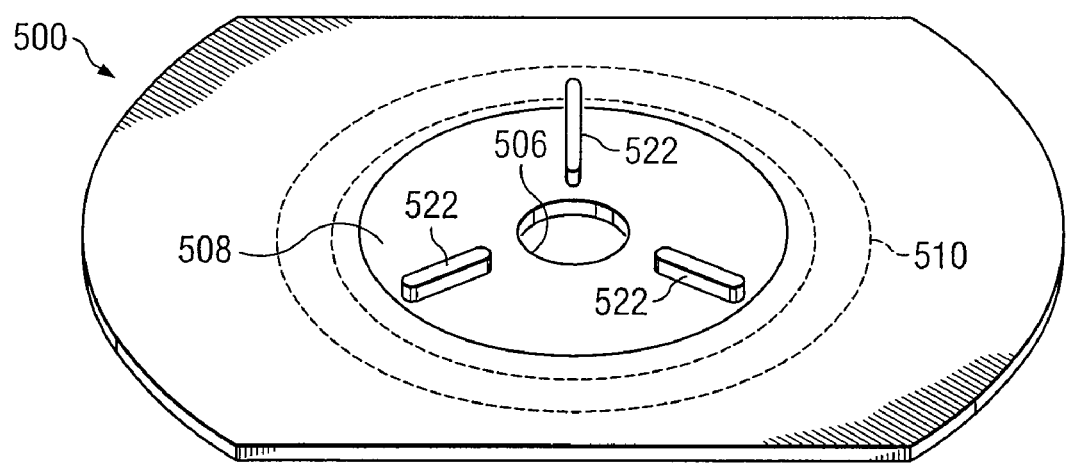

FIGS. 5A and 5B illustrate the optically readable side of an optical disc 500 featuring a plurality of stacker bars 522 in accordance with a particular embodiment of the present invention. Similar to optical discs 300 and 400 (FIGS. 3A-4B), optical disc 500 comprises a central clamping area 508 that defines a central aperture 506, which is configured to be engaged by the spindle mechanism of an optical disc drive. Radially surrounding central clamping area 508 is an optical data storage area 510, which stores data in the form of pits and lands that may be read by the reading laser of an optical disc drive. A plurality of stacker bars 522 are coupled to, or formed integrally with, central clamping area 508 and are configured to increased the planar thickness of central clamping area 508 above the planar thickness of optical data storage area 510. As shown in FIGS. 5A and 5B, optical disc 500 includes three such stacker bars 522 arranged approximately 120° from each other. It should be understood by one of ordinary skill the art, however, that other numbers of stacker bars 522 may be used in accordance with the teachings of the present invention. Furthermore, other arrangements of the stacker bars 522, including both symmetrical and nonsymmetrical arrangements, may also be used in accordance with the teachings of the present invention.

FIGS. 3A-5B illustrate a handful of the variety of stacker element shapes and configurations that may be used in accordance with the teachings of the present invention. With the benefit of this disclosure, one of ordinary skill in the art should be able to identify other stacker element shapes and configurations suitable for use in accordance with the teachings of the present invention.

Referring back to FIGS. 1A-D, particular embodiments of optical disc 100 may also include a magnetic stripe 116 (FIG. 1C) disposed on at least one surface of the optical disc. In such embodiments, optical disc 100 may also be used to store magnetically encoded information. In particular embodiments, this magnetically encoded information may include credit account information, debit account information, personal identification information, and/or other information. Since particular embodiments of optical disc 100 are thin enough to pass through traditional "swipe"-type magnetic stripe readers, this enables optical disc 100 to function as a conventional credit, debit, or personal identification card. Additional information on the incorporation of a magnetic stripe into an optical disc may be found in U.S. Pat. No. 6,597,653 issued to Burnett, which is hereby incorporated by reference.

Typically, magnetic stripe 116 is disposed on non-optically readable side 104 of optical disc 100. This helps prevent magnetic stripe 116 from interfering with the readability of the data stored in optical data storage area 110 of disc 100. However, in particular embodiments of the present invention, magnetic stripe 116 may be located on optically readable side 102 of optical disc 100. In such an embodiment, magnetic stripe 116 must be positioned so not to interfere with the readability of the data stored in optical data storage area 110.

To facilitate the reading of magnetic stripe 116 by a magnetic stripe reader, in particular embodiments of the present invention optical disc 100 may include one or more straight edges 114. In such an embodiment, magnetic stripe 116 is typically applied to optical disc 100 parallel and in close proximity to straight edge 114. This allows magnetic stripe 116 to be read during the linear movement of optical disc 100 through a magnetic stripe reader.

To further facilitate the reading of optical disc 100 by a magnetic stripe reader, particular embodiments of the present invention may position stacker elements 122 (FIGS. 1A-B) such that the stacker elements 122 do not impede the movement of optical disc 100 through a "swipe"-type magnetic stripe reader. For example, stacker elements may be placed on central clamping area 108 away from straight edge 114, towards a lateral center line of optical disc 100, as shown in FIGS. 1A and 1B.

Particular embodiments of the present invention may also smooth the surfaces of stacker elements 122 such that there is not an abrupt change in the thickness of central clamping area 108 over the thickness of optical data storage area 110. This helps prevent stacker elements 122 from becoming caught on other surfaces and helps prevent the chipping, cracking, or marring of optical disc 100 or objects that might come in contact with optical disc 100.

As mentioned above, optical disc 100 may include one or more straight edges 114. As shown in FIGS. 1A-C, optical disc 100 actually includes two, relatively parallel, straight edges 114. Optical disc 100 also includes two curved edges 112, which are configured to match the curvature of a conventional, round optical disk. In particular embodiments, the inclusion of curved edges 112 helps facilitate the nesting of optical disc 100 within the tray of a conventional optical disc drive. With two straight edges 114 and two curved edges 112, optical disc 100 may be described as having a hybrid, or "hockey rink," shape. It should be understood, however, that optical disc 100 may comprise various shapes, all in accordance with the teachings of the present invention.

Figure 2A:
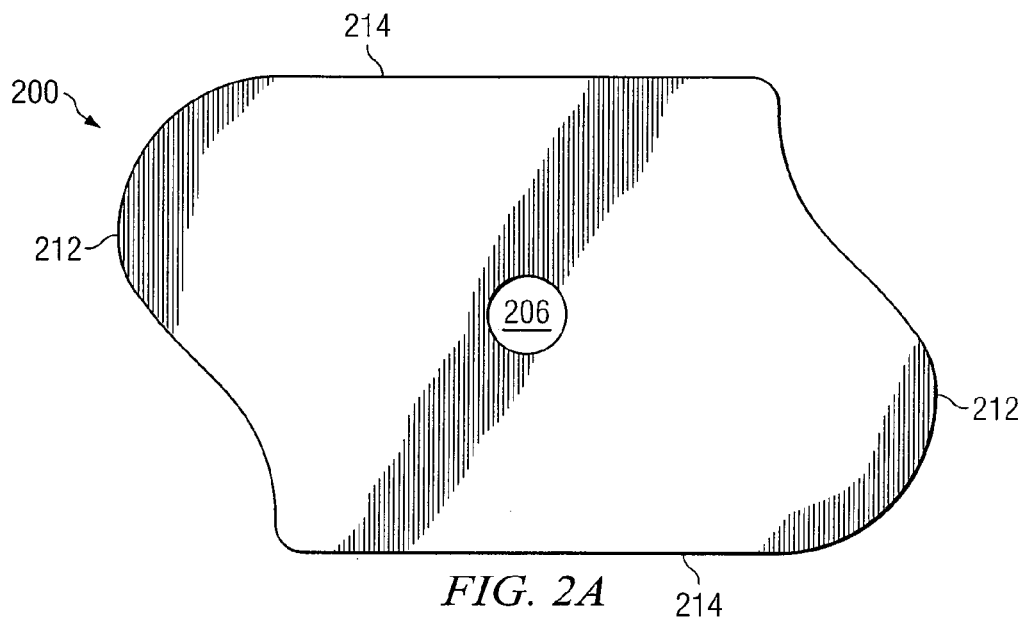
FIGS. 2A-C illustrate surface views of different optical disc shapes that may be used in accordance with particular embodiments of the present invention.
Figure 2B:
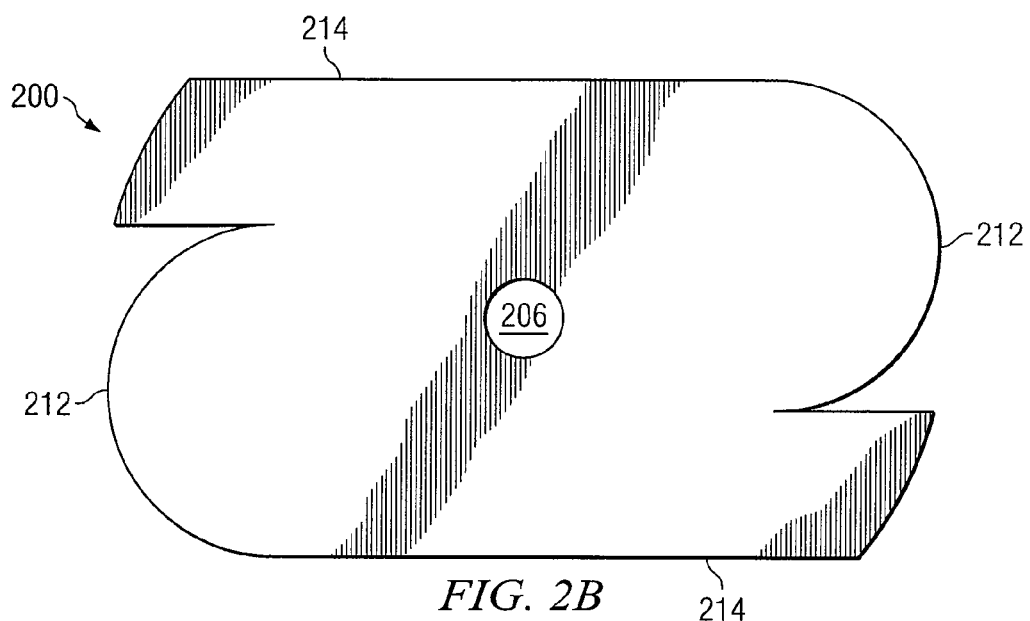
Figure 2C:
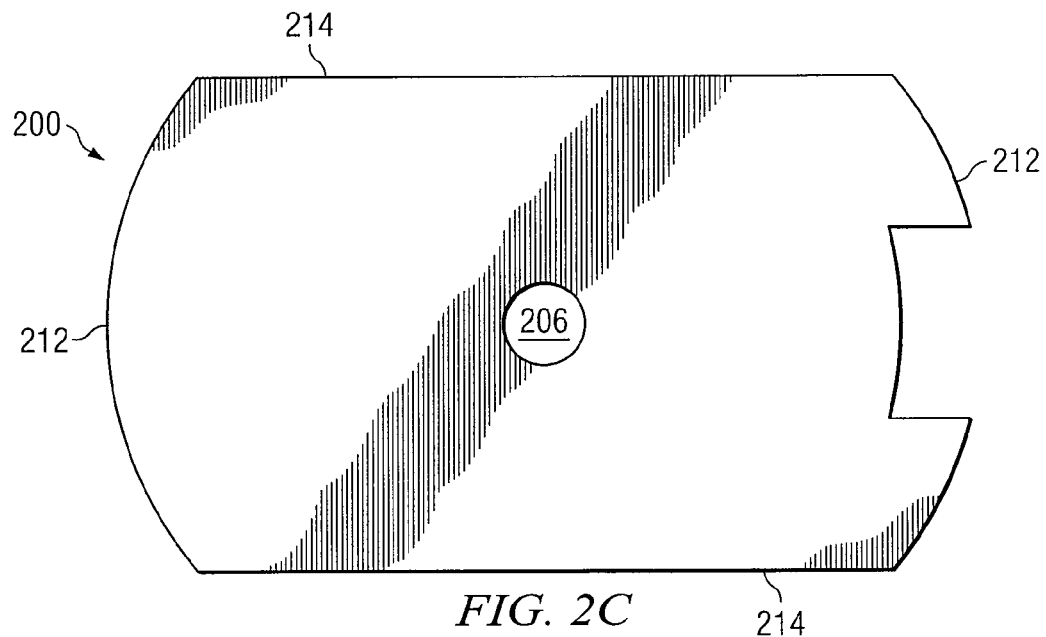

FIGS. 2A-C illustrate examples of other optical disc shapes that may be used in accordance with the present invention. FIGS. 2A-C each illustrate an optical disc 200 in accordance with a particular embodiment of the present invention. As shown in FIGS. 2A-C, each optical disc 200 includes a central aperture 206, two relatively parallel straight ends 214, and two curved ends 212. As mentioned before, the inclusion of straight ends 214 help facilitate the swiping of optical disc 200 through a conventional "swipe"-type magnetic stripe reader. The other aspects of the shape of optical disc 200, however, may be determined by various design considerations, including aesthetic qualities.

Referring back to FIGS. 1A-D, since optical disc 100 may be used as a credit, debit, or personal identification card, particular embodiments of optical disc 100 may also include other identifying information on the non-optically readable side 104 of optical disc 100. For example, in particular embodiments, optical disc 100 may also include a signature block 118 for a user to sign his or her name on. This allows merchants to compare the signature of someone trying to use optical disc 100 to the signature of the authorized user. In particular embodiments, optical disc 100 may also include a bar code 120 containing further information about the optical disc and/or user. For example, in particular embodiments bar code 120 may include a UPC code or a bar code representing the disc owner's name and/or account number. The remainder of side 104 of optical disc 100 may be used to display logos or other graphics. Although identifying information, such as signature box 118, bar code 120, and graphics and logos, have been discussed in regard to non-optically readable side 104 of optical disc 100, it should be understood by one of ordinary skill in the art that these features, as well as others, could also appear on optically readable side 102 of optical disc 100, provided these features are positioned so as not to inhibit the readability of the data stored in optical data storage area 110.

Due to the reduced thickness of optical discs in accordance with the present invention, particular embodiments of the optical discs also have a reduced mass. This reduced mass may prove problematic with weight-sensitive optical disc drives. Specifically, in particular embodiments of the present invention, these optical discs may be too light for such weight-sensitive optical disc drives to sense. To ensure that the optical discs are readable by these weight-sensitive optical disc drives, particular embodiments of the present invention may also include a label on the non-optically readable side 104 of optical disc 100 that is configured to increase the mass of optical disc 100 such that it approximates the mass of a conventional optical disc. In particular embodiments, the labels are designed to include additional mass near the edges of the disc where the mass has a greater effect as the disc is spun by an optical disc drive. Other particular embodiments of the present invention, rather than applying additional mass in the form of a label, may embed additional weight in the optical disc itself. In such embodiments, the additional mass may also be included near the edges of the disc where it has a greater effect.

Particular embodiments of the present invention may also include a label coupled to non-optically readable side 104 of optical disc 100 that is configured to increase the thickness of the optical disc. In such an embodiment, the thickness of the label may be chosen to achieve a desired thickness of the optical disc that is greater than the native thickness of the disc. For example, a 0.10 mm thick label may be applied to a 0.65 mm thick optical disc to yield a 0.75 mm thick labeled disc. As such, the use of a label that increases the thickness of the optical disc allows users greater flexibility in the finished thickness of optical disc.

Particular embodiments of the present invention may also include a resilient metallic layer coupled to non-optically readable side 104 of optical disc 100. Such a resilient metallic layer may be used to increase the rigidity of the optical disc. This additional rigidity may help increase the durability of the optical disc, as well as facilitate its use as magnetic stripe card.

Generally, optically readable side 104 of optical disc 100 is comprised of polycarbonate or another suitable material, which may be clear or colored. For example, in particular embodiments of the present invention, the polycarbonate or other material may be any suitable color, such as black or yellow. In embodiments where the polycarbonate or other material is colored, the color of the material may be selected to give the material a desired index of refraction. Thus, in such embodiments, the color of the material may be selected to change the depth at which the reading laser of an optical disc drive is focused and/or change the angle of reflection of the laser off the pits and/or lands of the optical disc. By tailoring the index of refraction of the material by selecting its color, particular embodiments of the present invention may provide enhanced readability. With the benefit of this disclosure, one of ordinary skill in the art should be able to select a color to result in a index of refraction that is suitable given a particular thickness of the optical disc.

In particular embodiments of the present invention, optical disc 100 may also include an electronic tag 130 embedded within or coupled to the disc. In particular embodiments, electronic tag 130 may comprise a radio frequency ("RF") tag, radio frequency identification ("RFID") tag, or any other suitable electronic tag.

Generally, electronic tag 130 comprises an electronic circuit 132 and an associated antenna 134. In particular embodiments, electronic circuit 132 comprises a transponder with a digital memory chip that has a unique identification code. The transponder uses the associated antenna 134 to send and receive information. As shown in FIGS. 1A and B, antenna 134 is illustrated as extending circumferentially around aperture 106. However, it should be understood that antenna 134 may have other configurations and/or orientations in accordance with the teachings of the present invention. Similarly, electronic circuit 132 may have other configurations and/or orientation without deviating from the teachings of the present invention.

Generally, electronic tag 130 may be embedded within or coupled to optical disc 100 using any suitable method. For example, in particular embodiments of the present invention, electronic tag 130 may be embedded within optical disc 100 during an injection molding process or by laminating electronic tag 130 into optical disc 100 during manufacturing. In other embodiments, electronic tag 130 may be coupled to the surface of optical disc 100 by simply adhering electronic tag 130 to the surface of optical disc 100.

In particular embodiments, an interrogation device (not illustrated) may be used to read data from the electronic tag 130. The interrogation device may then decode the data encoded in the digital memory chip and pass the data on to a computer for processing. In particular embodiments of the present invention, the interrogation device may also be operable to write data to electronic tag 130. For example, in particular embodiments, electronic tag 130 may be configured to operate in a contactless payment system, such as a contactless credit or debit payment system. In such a system, electronic tag 130 may interact with an interrogation device at a point-of-sale to make a financial transaction. In other particular embodiments, electronic tag 130 may be configured to operate in a RFID tracking and/or identification system, such as an electronic article surveillance ("EAS") system. Other suitable uses for electronic tag 130 will be apparent to one of ordinary skill in the art with the benefit of this disclosure.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. An optical disc, comprising:
   a central clamping area that defines a central aperture operable to be engaged by a spindle mechanism of an optical disc drive;
   an optically-readable data storage area substantially surrounding the central clamping area, the optically-readable data storage area having a planar thickness of less than 1.20 mm;
   an electronic tag coupled to or embedded within the optical disc, the electronic tag comprising a radio frequency tag or radio frequency identification tag, and
   at least one stacker element coupled to or integral with the central clamping area to increase the thickness of a portion of the central clamping area to a thickness greater than the data storage area without increasing the thickness of the data storage area.

2. The optical disc of claim 1, wherein the electronic tag is operable for use in a contactless payment system.

3. The optical disc of claim 1, wherein the planar thickness of the optically-readable data storage area is less than or equal to about 0.95 mm.

4. The optical disc of claim 1, wherein the planar thickness of the optically-readable data storage area is less than or equal to about 0.85 mm.

5. The optical disc of claim 1, wherein the planar thickness of the optically-readable data storage area is less than or equal to about 0.58 mm.

6. The optical disc of claim 1, wherein the planar thickness of the optically-readable data storage area is from about 0.80 mm to about 0.86 mm.

7. The optical disc of claim 1, further comprising one or more stacker elements coupled to, or integral with, the central clamping area, the stacker elements configured to increase the thickness of the central clamping area above the planar thickness of the optically-readable data storage area.

8. The optical disc of claim 7, wherein the one or more stacker elements are configured to increase a distance between the optically-readable data storage area and a reading laser of an optical disc drive.

9. The optical disc of claim 7, wherein the one or more stacker elements comprise one or more stacker bars that radiate outwardly from the central aperture.

10. The optical disc of claim 1, further comprising a magnetic stripe disposed upon a surface of the optical disc.

11. The optical disc of claim 10, wherein the magnetic stripe is disposed on an optically-readable side of the optical disc.

12. The optical disc of claim 10, wherein the magnetic stripe is disposed on a non-optically readable side of the optical disc.

13. The optical disc of claim 1, further comprising a code embedded in the optically-readable data storage area operable to affect a reading speed of the optical disc drive.

14. The optical disc of claim 1, further comprising a label coupled with a non-optically readable side of the optical disc, the label configured to increase the mass of the optical disc to enable the optical disc to be operable on a weight-sensitive disc drive.

15. The optical disc of claim 1, further comprising a label coupled with a non-optically readable side of the optical disc, the label configured to increase the planar thickness of optical disc.

16. The optical disc of claim 1, further comprising a resilient metallic layer coupled with a non-optically readable side of the optical disc, the resilient metallic layer configured to increase the rigidity of the optical disc.

17. The optical disc of claim 1, wherein the optical disc comprises polycarbonate, and wherein the color of the polycarbonate is selected to result in a desired index of refraction.

18. The optical disc of claim 1, wherein the optical disc comprises polycarbonate, and wherein the color of the polycarbonate is selected to enhance the readability of the optical disc.

19. The optical disc of claim 1, wherein the central clamping area is directly engageable with a spindle mechanism without coupling to another element that increases the thickness of the optically-readable data storage area.

20. The optical disc of claim 1, further comprising:
an antenna connected to the electronic tag, wherein the electronic tag and the antenna are coupled to a surface of the optical disc.

21. The optical disc of claim 20, wherein the electronic tag and the antenna are coupled to a surface of the central clamping area.

22. The optical disc of claim 1, further covering
an antenna connected to the electronic tag, wherein the electronic tag and the antenna are embedded within the optical disc.

23. The optical disc of claim 22, wherein the electronic tag and the antenna are embedded within the central clamping area of the optical disc.

24. An optical disc, comprising:
a central clamping area that defines a central aperture operable to be engaged by a spindle mechanism of an optical disc drive;
an optically-readable data storage area substantially surrounding the central clamping area, the optically-readable data storage area having a planar thickness of less than 1.20 mm;
one or more stacker elements coupled to, or integral with, the central clamping area, the stacker elements configured to increase the thickness of the central clamping area above the planar thickness of the optically-readable data storage area without increasing the thickness of the optically-readable data storage area; and
an electronic tag coupled to or embedded within the optical disc, the electronic tag comprising a radio frequency tag or radio frequency identification tag.

25. The optical disc of claim 24, wherein the electronic tag is operable for use in a contactless payment system.

26. The optical disc of claim 24, wherein the planar thickness of the optically-readable data storage area is less than or equal to about 0.95 mm.

27. The optical disc of claim 24, wherein the planar thickness of the optically-readable data storage area is less than or equal to about 0.85 mm.

28. The optical disc of claim 24, wherein the planar thickness of the optically-readable data storage area is less than or equal to about 0.58 mm.

29. The optical disc of claim 24, wherein the planar thickness of the optically-readable data storage area is from about 0.80 mm to about 0.86 mm.

30. The optical disc of claim 24, wherein the one or more stacker elements are configured to increase a distance between the optically-readable data storage area and a reading laser of an optical disc drive.

31. The optical disc of claim 24, wherein the one or more stacker elements comprise one or more stacker bars that radiate outwardly from the central aperture.

32. The optical disc of claim 24, further comprising a magnetic stripe disposed on a surface of the optical disc.

33. The optical disc of claim 32, wherein the magnetic stripe is disposed on an optically-readable side of the optical disc.

34. The optical disc of claim 32, wherein the magnetic stripe is disposed on a non-optically readable side of the optical disc.

35. The optical disc of claim 24, further comprising a code embedded in the optically-readable data storage area operable to affect a reading speed of the optical disc drive.

36. The optical disc of claim 24, further comprising a label coupled with a non-optically readable side of the optical disc, the label configured to increase the mass of the optical disc to enable the optical disc to be operable on a weight-sensitive disc drive.

37. The optical disc of claim 24, further comprising a label coupled with a non-optically readable side of the optical disc, the label configured to increase the planar thickness of the optical disc.

38. The optical disc of claim 24, further comprising a resilient metallic layer coupled with a non-optically readable side of the optical disc, the resilient metallic layer configured to increase the rigidity of the optical disc.

39. The optical disc of claim 24, wherein the optical disc comprises polycarbonate, and wherein the color of the polycarbonate is selected to result in a desired index of refraction.

40. The optical disc of claim 24, wherein the optical disc comprises polycarbonate, and wherein the color of the polycarbonate is selected to enhance the readability of the optical disc.

41. An optical disc, comprising:
   a central clamping area that defines a central aperture operable to be engaged by a spindle mechanism of an optical disc drive;
   an optically-readable data storage area substantially surrounding the central clamping area, the optically-readable data storage area having a planar thickness of less than 1.20 mm;
   one or more stacker elements coupled to, or integral with, the central clamping area, the stacker elements configured to increase the thickness of the central clamping area above the planar thickness of the optically-readable data storage area without increasing the thickness of the optically-readable data storage area;
   a magnetic stripe disposed upon a surface of the optical disc without increasing the thickness of the optically-readable data storage area; and
   an electronic tag coupled to or embedded within the optical disc, the electronic tag comprising a radio frequency tag or radio frequency identification tag.

42. The optical disc of claim 41, wherein the electronic tag is operable for use in a contactless payment system.

43. The optical disc of claim 41, wherein the planar thickness of the optically-readable data storage area is less than or equal to about 0.95 mm.

44. The optical disc of claim 41, wherein the planar thickness of the optically-readable data storage area is less than or equal to about 0.85 mm.

45. The optical disc of claim 41, wherein the planar thickness of the optically-readable data storage area is less than or equal to about 0.58 mm.

46. The optical disc of claim 41, wherein the planar thickness of the optically-readable data storage area is from about 0.80 mm to about 0.86 mm.

47. The optical disc of claim 41, wherein the one or more stacker elements are configured to increase a distance between the optically-readable data storage area and a reading laser of an optical disc drive.

48. The optical disc of claim 41, wherein the one or more stacker elements comprise one or more stacker bars that radiate outwardly from the central aperture.

49. The optical disc of claim 41, wherein the magnetic stripe is disposed on an optically-readable side of the optical disc.

50. The optical disc of claim 41, wherein the magnetic stripe is disposed on a non-optically readable side of the optical disc.

51. The optical disc of claim 41, further comprising a code embedded in the optically-readable data storage area operable to affect a reading speed of the optical disc drive.

52. The optical disc of claim 41, further comprising a label coupled with a non-optically readable side of the optical disc, the label configured to increase the mass of the optical disc to enable the optical disc to be operable on a weight-sensitive disc drive.

53. The optical disc of claim 41, further comprising a label coupled with a non-optically readable side of the optical disc, the label configured to increase the planar thickness of the optical disc.

54. The optical disc of claim 41, further comprising a resilient metallic layer coupled with a non-optically readable side of the optical disc, the resilient metallic layer configured to increase the rigidity of the optical disc.

55. The optical disc of claim 41, wherein the optical disc comprises polycarbonate, and wherein the color of the polycarbonate is selected to result in a desired index of refraction.

56. The optical disc of claim 41, wherein the optical disc comprises polycarbonate, and wherein the color of the polycarbonate is selected to enhance the readability of the optical disc.

57. An optical disc, comprising:
   a central clamping area that defines a central aperture operable to be engaged by a spindle mechanism of an optical disc drive;
   an optically-readable data storage area substantially surrounding the central clamping area, the optically-readable data storage area having a planar thickness of less than 1.20 mm; and
   an electronic tag coupled to or embedded within the optical disc, wherein the central clamping area is directly engageable with a spindle mechanism without coupling to another element that increases the thickness of the optically-readable data storage area, and wherein at least a portion of the central clamping area is thicker than a maximum thickness of the data storage area.

58. An optical disc, comprising:
   a central clamping area that defines a central aperture operable to be engaged by a spindle mechanism of an optical disc drive;
   an optically-readable data storage area substantially surrounding the central clamping area; and
   an electronic tag coupled to or embedded within the optical disc, the electronic tag comprising a radio frequency tag or radio frequency identification tag, wherein the central clamping area is directly engageable with a spindle mechanism without coupling to another element that increases the thickness of the optically-readable data storage area, and wherein at least a portion of the central clamping area is thicker than a maximum thickness of the data storage area.

59. An optical disc, comprising:
   a central clamping area that defines a central aperture operable to be engaged by a spindle mechanism of an optical disc drive;
   an optically-readable data storage area substantially surrounding the central clamping area;
   one or more stacker elements coupled to, or integral with, the central clamping area, the stacker elements configured to increase the thickness of the central clamping area above the planar thickness of the optically-readable data storage area without increasing the thickness of the optically-readable data storage area; and
   an electronic tag coupled to or embedded within the optical disc, the electronic tag comprising a radio frequency tag or radio frequency identification tag.

60. An optical disc, comprising:
   a central clamping area that defines a central aperture operable to be engaged by a spindle mechanism of an optical disc drive;
   an optically-readable data storage area substantially surrounding the central clamping area;
   one or more stacker elements coupled to, or integral with, the central clamping area, the stacker elements configured to increase the thickness of the central clamping area above the planar thickness of the optically-readable data storage area without increasing the thickness of the optically-readable data storage area;
   a magnetic stripe disposed upon a surface of the optical disc; and an electronic tag coupled to or embedded within the optical disc, the electronic tag comprising a radio frequency tag or radio frequency identification tag.

61. An optical disc, comprising:

a central clamping area that defines a central aperture operable to be engaged by a spindle mechanism of an optical disc drive;

an optically-readable data storage area substantially surrounding the central clamping area; and an electronic tag coupled to or embedded within the optical disc, wherein the central clamping area is directly engageable with a spindle mechanism without coupling to another element that increases the thickness of the optically-readable data storage area, and wherein at least a portion of the central clamping area is thicker than a maximum thickness of the data storage area.

* * * * *